United States Patent Office  3,156,676
Patented Nov. 10, 1964

3,156,676
ALLYL NORTRICYCLENE COMPOUNDS AND POLYMERS THEREOF
Henri G. G. Dekking, Montville, N.J., assignor to Celanese Corporation of America, New York, N.Y., a corporation of Delaware
No Drawing. Filed Sept. 28, 1959, Ser. No. 842,602
15 Claims. (Cl. 260—88.2)

This invention relates to new ethylenically unsaturated compounds and polymers thereof.

It is an object of this invention to provide new ethylenically unsaturated compounds. It is a further object of this invention to provide ethylenically unsaturated compounds which may be polymerized into useful high melting polymers. It is a still further object of this invention to provide new and useful polymers in a wide variety of applications, e.g. in the formation of fibers, films and molded articles. Other objects will become apparent from the following description and claims.

In accordance with one aspect of this invention, there are provided as new compounds allyl nortricyclenes.

A particularly suitable group of compounds are the 3-allyl nortricyclenes which have the formula

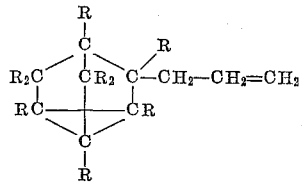

wherein the R's may be of any of various radicals including hydrogen, alkyl, e.g. containing up to 4 carbon atoms, such as methyl ethyl, propyl and n-butyl, and aryl such as phenyl, naphthyl, and the latter radicals substituted with alkyl groups, e.g. containing up to 4 carbon atoms. The R's may be the same or different. If the R's are all hydrogen atoms the resulting compound is 3-allyl nortricyclene. This compound may also be called 3-allyl tricyclo [2.2.1.0$^{2,6}$] heptane.

Other specific allyl nortricyclenes are 3-allyl-5-methyl nortricyclene,
1-methyl-3-allyl nortricyclene,
3-allyl-7-methyl nortricyclene,
3-allyl-5-ethyl nortricyclene,
1-ethyl-3-allyl nortricyclene,
3-allyl-7-ethyl nortricyclene,
3-allyl-5,5-dimethyl nortricyclene,
3-allyl-5,5-diethyl nortricyclene,
1-allyl nortricyclene,
4-allyl nortricyclene,
7-allyl nortricyclene,
3-(alpha-methyl) allyl nortricyclene and 3-(alpha-ethyl) allyl nortricyclene.

In the allyl nortricyclenes of this invention, an allyl group may be substituted on any of the carbon atoms of the nortricyclene structure. Moreover, the ring carbon atoms may be bonded to any of the radicals included in the definition of R in the formula given in the discussion above of the 3-allyl nortricyclnes. In addition, the hydrogen atoms of the alpha carbon atom of the allyl group, i.e., the carbon atom not bonded by an ethylenic bond, may be substituted with any of various radicals including alkyl e.g. containing up to 4 carbon atoms and aryl groups such as phenyl. The substituent groups both on the ring carbon atoms and in the alkyl group may be the same or different.

The above compounds may be prepared from the corresponding halo compound, e.g., the chloride or bromide, by reacting the latter with magnesium to form a Grignard reagent and reacting the Grignard reagent with an allyl halide e.g. allyl bromide or chloride, to form the allyl nortricyclene. For example, a 3-allyl nortricyclene may be prepared in accordance with the following equations where X is halogen:

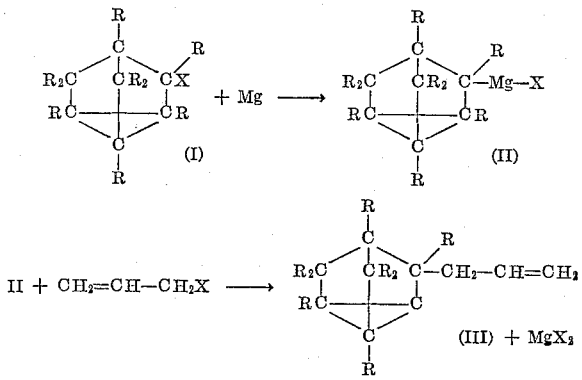

In many cases the halo compound used to prepare the Grignard reagent may be prepared by reacting the corresponding cyclopentadiene with an unsaturated halide in a Diels-Alder reaction. Thus, 3-allyl nortricyclene may be prepared from cyclopentadiene and vinyl chloride as in the following equations:

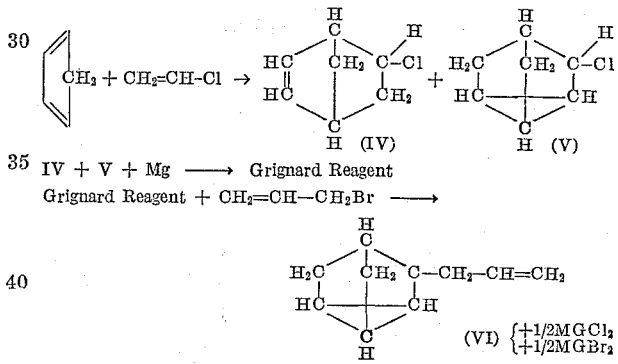

IV + V + Mg ⟶ Grignard Reagent
Grignard Reagent + CH$_2$=CH—CH$_2$Br ⟶

The above synthesis takes advantage of the fact that a large part of the 5-chloro-bicyclo [2.2.1]-hept-2-ene (compound IV) which forms from the reaction of cyclopentadiene and vinyl chloride is apparently isomerized to the corresponding nortricyclene compound on formation and reaction of the Grignard reagent.

The following example illustrates the preparation of 3-allyl nortricyclene as shown in the above equation. All parts are by weight.

*Example 1*

252 parts of freshly distilled cyclopentadiene cooled to −70° C. and 252 parts of liquid vinyl chloride were charged to a stainless steel reaction vessel and heated to 170° C. at which temperature the reactants were agitated for 15 hours. The experiment was then repeated using 315 parts of cyclopentadiene and 315 parts of vinyl chloride. The two batches were combined and unreacted vinyl chloride removed by heating the reaction mixture on a steam bath. The residue was fractionated and 456.7 parts of a fraction boiling at 45–47° C. at 12 millimeters of mercury pressure absolute were collected. This fraction had an index of refraction of 1.4930 (N$_D^{25}$) and comprised a mixture of isomeric compounds IV and V.

To a vessel which was previously purged with prepurified nitrogen were charged 73 parts of magnesium powder and 70.8 parts of anhydrous ether. A crystal of iodine and 10 grams of the fraction of isomeric compounds prepared as described above were added. After a few minutes a vigorous reaction ensued and the solution of 311 parts of the isomeric fraction in 708 parts of anhydrous ether was added at such a rate to maintain constant reflux. After 5½ hours the addition was complete and the mixture was stirred for an additional hour and filtered. Acid base titration indicated the formation of 336 parts of Grignard reagent.

To a mixture of 363 parts of allyl bromide and 212.4 parts of ether in a vessel previously purged with prepurified nitrogen were added over a period of 5 hours the mixture containing 336 parts of Grignard reagent prepared as described above, holding back the unreacted magnesium from the Grignard reagent by careful decantation. Continuous reflux was noted. After stirring the slurry for 2 more hours at room temperature, the magnesium halide-etherate was allowed to settle overnight. The clear supernatant liquid was separated from the magnesium halide-etherate and washed with an aqueous ammonium chloride solution followed by water. The organic layer obtained was added to another organic layer obtained by decomposing the solid magnesium halide-etherate on ice plus ammonium chloride. The latter treatment has the effect of liberating the organic liquids still clinging to the solid magnesium halide etherate. The combined organic layers were dried over calcium chloride, filtered, and ether and allyl bromide removed on a steam bath. The residue was dried and fractionated to yield 198.7 parts of a fraction boiling at 58 to 61° C. at 15 millimeters mercury pressure, consisting mainly of 3-allyl nortricyclene. The fraction had an index of refraction of 1.4700 ($N_D^{25}$) and infra-red analysis confirmed the presence of the nortricyclene and terminal vinyl groups.

In accordance with another aspect of this invention, the cyclic compounds may be homopolymerized to form polymers of high softening point. In addition these compounds may be copolymerized with other monomers to form copolymers of improved properties. For example they may be copolymerized with hydrocarbon comonomers e.g. ethylene, propylene, n-butylene, isobutylene and 4-methylpentene. The amount of comonomer in the monomeric mixture may vary for example between 0.5 and 99.5 percent by weight.

The polymerization may be suitably carried out in the presence of a catalyst system comprising two components, one of which is a compound of a transition metal of groups IIIa, IVa, Va or VIa of the periodic table (Mendeleef) in which the metal has a valence above its most reduced state. Some suitable compounds are halides such as chlorides, bromides and iodides, alcoholates such as butylates and acetylacetonates. Particularly preferred are the halides such as titanium tetrachloride or trichloride and zirconium tetrachloride.

The second component of the catalysts system is a metallo-organic compound or a hydride of at least one member of the class consisting of aluminum and the group Ia, IIa and IIb metals of the Periodic Table (Mendeleef) or one or more of these metals in finely dispersed free form. The metallo-organic compounds have a metal atom directly linked to a carbon atom.

A preferred group of compounds which may be used as the second component are the organo-aluminum compounds e.g. aluminum trialkyls in which the alkyl group contain 1 to 10 carbon atoms such as triisobutyl aluminum, aluminum triaryls such as triphenyl aluminum, aluminum alkyl halides, e.g., aluminum methyl sesquihalide, and lithium aluminum alkyls such as lithium aluminum tetramethyl.

Other metallo-organic compounds which may be used are, for example, dimethyl zinc and various Grignard reagents such as phenyl magnesium bromide. Examples of hydrides and free, finely dispersed metals which may be used are the hydrides and free forms of aluminum, lithium and sodium.

The transition metal compound may be suitably used in an amount of 0.01 to 0.1 part by weight per part of monomer and the second component in an amount of 0.1 to 10 part by weight per part of transition metal compound.

The polymerization may be conveniently carried out in the presence of a solvent for the monomeric material. Among the suitable solvents are aromatic hydrocarbons, such as xylene and cycloaliphatic hydrocarbons such as cyclohexane and decahydronaphthalene. The amount of solvent used is preferably from about 1 to about 5 parts by weight per part of monomer.

The polymerization is suitably carried out under moderate conditions e.g. a temperature of 25 to 80° C. and at atmospheric or higher pressure.

The following examples illustrate the preparation of polymers in accordance with the invention.

*Example II*

50 cc. of dry xylene were charged to a vessel at atmospheric pressure which had been flushed with prepurified nitrogen. A slow stream of prepurified nitrogen was bubbled through the solvent and this stream was maintained throughout the polymerization reaction. After 10 minutes, 10 millimoles of titanium tetrachloride were added to the vessel. The solution was then heated to 70° C. after which 40 millimoles of triisobutyl aluminum as a 1.25 molar solution in xylene were added in the course of ½ hour, during which time the reactants were kept at 70° C. After the aluminum alkyl had been added, 13.8 grams of 3-allyl nortricyclene were poured into the vessel. The reaction mixture was stirred for a total of 6 hours at 70° C. and the now viscous liquid was cooled and poured into a mixture of methanol and hydrochloric acid. The solid polymer precipitated and was freed of catalyst particles by stirring in a Waring Blendor with a mixture of methanol and hydrochloric acid. A total of 4.8 grams of poly-3-allyl nortricyclene was obtained.

The polymer was extracted with heptane by 24 hour reflux in a Soxhlet extractor. The heptane insoluble portion of the polymer which was 76 percent by weight of the total had an ordered X-ray diffraction pattern. Infrared analysis confirmed that the polymer had a structure resulting from the polymerization of 3-allyl nortricyclene through the ethylenic unsaturation of the allyl group. The polymer had a melting point of about 300° C.

*Example III*

150 cc. of dry xylene were charged at atmospheric pressure to a vessel which had been flushed with prepurified nitrogen. A slow stream of prepurified nitrogen was bubbled through the solvent and this stream was maintained throughout the polymerization reaction. After 10 minutes, 20 millimoles of titanium tetrachloride were added. The solution was then warmed to 60° C. and 80 millimoles of aluminum triisobutyl as a 1.25 molar solution in xylene were added in the course of ½ hour. The solution was then heated to 70° C. and 25 grams of 3-allyl nortricyclene were added at once. Ethylene was then bubbled into the solution and the reaction mass was stirred at 75° C. for 2½ hours during which period additional xylene was added to dilute the solution and keep the catalyst dispersed. Then 85.3 grams of polymer were precipitated by pouring the solution into a mixture of methanol and hydrochloric acid.

The polymer was extracted with heptane by 24 hour reflux in a Soxhlet extractor. The heptane soluble portion of the polymer which was 32% of the total contained 45% of polymerized ethylene and the remainder polymerized 3-allyl nortricyclene. Its softening point was 100° C. The heptane insoluble portion contained 95% polymerized ethylene and the remainder polymerized 3-allyl nortricyclene, and had a softening point of 130° C.

The polymers of this invention have a wide variety of uses. For example they may be used in the production of film and molded articles such as household ware, containers, closures, toys etc. Moreover, the more highly melting polymers may be formed into fibers for the manufacture of textiles.

It is to be understood that the foregoing detailed description is given merely by way of illustration and that many variations may be made therein without departing from the spirit of my invention.

Having described my invention what I desire to secure by Letters Patent is:

1. 3-allyl nortricyclene.
2. A process of making 3-allyl nortricyclene which comprises reacting an isomeric mixture of 3-chloro nortricyclene and 5-chloro-bicyclo[2.2.1]-hept-2-ene with magnesium to form a Grignard reagent and reacting said Grignard reagent with allyl bromide.
3. A homopolymer of 3-allyl nortricyclene.
4. A process of polymerizing a compound of a formula

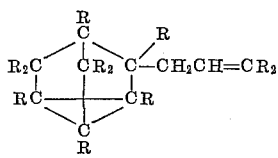

wherein each R is separately selected from the group consisting of hydrogen, alkyl radicals containing up to 4 carbon atoms, phenyl, naphthyl, phenyl radicals substituted with alkyl groups containing up to 4 carbon atoms, and naphthyl radicals substituted with alkyl groups containing up to 4 carbon atoms in contact with an organic solvent for said compound and a catalyst system comprising a titanium halide in which the titanium has a valence above two and an organo-aluminum compound in which an aluminum atom is directly bonded to a carbon atom.

5. A process comprising polymerizing 3-allyl nortricyclene in contact with an organic solvent for said 3-allyl nortricyclene and a catalyst system comprising titanium tetrachloride and an aluminum trialkyl in which the alkyl groups contain up to 10 carbon atoms.

6. A copolymer of 3-allyl nortricyclene and ethylene containing from about 45 percent up to about 95 percent polymerized ethylene and the remainder polymerized 3-allyl nortricyclene.

7. A copolymer in accordance with claim 6 having a softening point in the range of from 100° C. to about 130° C.

8. A homopolymer of 3-allyl nortricyclene having a melting point of about 300° C.

9. A process of producing a compound of the formula

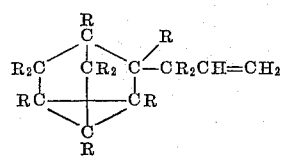

wherein each R is separately selected from the group consisting of hydrogen, alkyl radicals containing up to 4 carbon atoms, phenyl, naphthyl, phenyl radicals substituted with alkyl groups containing up to 4 carbon atoms, and naphthyl radicals substituted with alkyl groups containing up to 4 carbon atoms which comprises reacting a compound of the formula

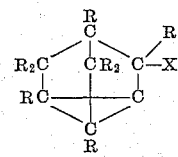

wherein the R's are defined above and X is halogen with magnesium to form a Grignard reagent and reacting said Grignard reagent with allyl halide.

10. A homopolymer of a compound having the formula

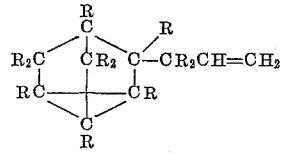

wherein each R is separately selected from the group consisting of hydrogen, alkyl radicals containing up to 4 carbon atoms, phenyl, naphthyl, phenyl radicals substituted with alkyl groups containing up to 4 carbon atoms, and naphthyl radicals substituted with alkyl groups containing up to 4 carbon atoms.

11. A copolymer of a hydrocarbon having an alpha ethylene unsaturation and containing up to 6 carbon atoms with a compound having the formula

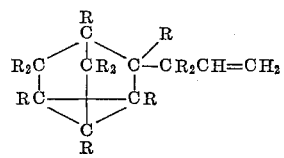

wherein each R is separately selected from the group consisting of hydrogen, alkyl radicals containing up to 4 carbon atoms, phenyl, naphthyl, phenyl radicals substituted with alkyl groups containing up to 4 carbon atoms, and naphthyl radicals substituted with alkyl groups containing up to 4 carbon atoms.

12. A copolymer of 3-allyl nortricyclene with a hydrocarbon having an alpha ethylenic unsaturation and containing up to 6 carbon atoms.

13. A process of polymerizing a compound of a formula

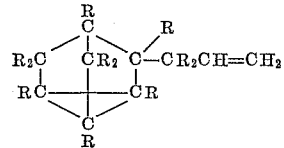

wherein each R is separately selected from the group consisting of hydrogen, alkyl radicals containing up to 4 carbon atoms, phenyl, naphthyl, phenyl radicals substituted with alkyl groups containing up to 4 carbon atoms, and naphthyl radicals substituted with alkyl groups containing up to 4 carbon atoms, in contact with a catalyst system comprising a compound of a metal having a valence above that of its most reduced state and selected from the class consisting of the metals of groups IIIa, IVa, Va and VIa of the periodic table (Mendeleef) and as a second component of said catalyst system, a member of the class consisting of metallo-organic compounds and hydrides of aluminum and the metals of groups Ia, IIa and IIb of the periodic table (Mendeleef) and said metals of said second component in finely dispersed free form.

14. A process comprising copolymerizing a hydrocarbon having an alpha ethylenic unsaturation and containing up to 6 carbon atoms with a compound having the formula

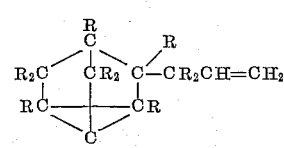

wherein each R is separately selected from the group consisting of hydrogen, alkyl radicals containing up to 4 carbon atoms, phenyl, naphthyl, phenyl radicals substituted with alkyl groups containing up to 4 carbon atoms, and naphthyl radicals substituted with alkyl groups containing up to 4 carbon atoms in contact with an organic solvent for said compounds and a catalyst system comprising a titanium halide in which the titanium has a valence above two and an organo-aluminum compound in which an aluminum atom is directly bonded to a carbon atom.

15. A process comprising copolymerizing 3-alkyl nortricyclene with a hydrocarbon having an alpha ethylenic unsaturation and containing up to 6 carbon atoms in contact with an organic solvent for said compounds and a catalyst system comprising titanium tetrachloride and an aluminum trialkyl in which the alkyl groups contain up to 10 carbon atoms.

References Cited in the file of this patent

UNITED STATES PATENTS 2,782,238  Bluestone et al. _____ Feb. 19, 1957

OTHER REFERENCES

Felinsky et al.: Annalen, 476 (1929), pages 60–70.
Corey et al.: Journal American Chemical Society, vol. 79, pages 5773–7 (1957).
The Condensed Chemical Dictionary, Reinhold (fifth edition), 1956, page 881.